L. J. JENSON.
AUTOMATIC HAY SWEEP CLEANER.
APPLICATION FILED JULY 31, 1918.
1,371,423.
Patented Mar. 15, 1921.
3 SHEETS—SHEET 3.
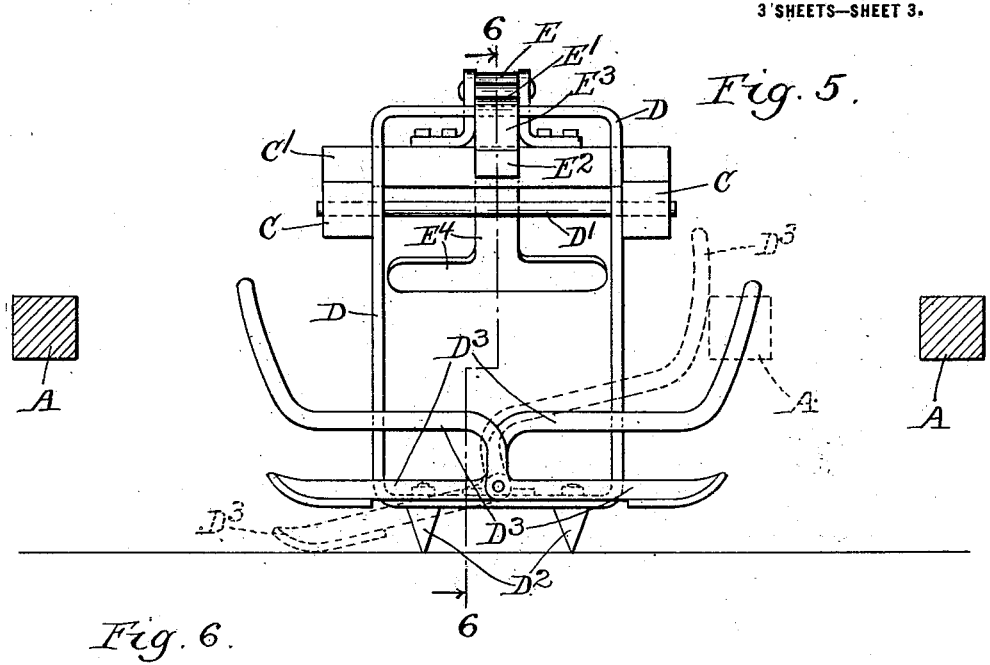
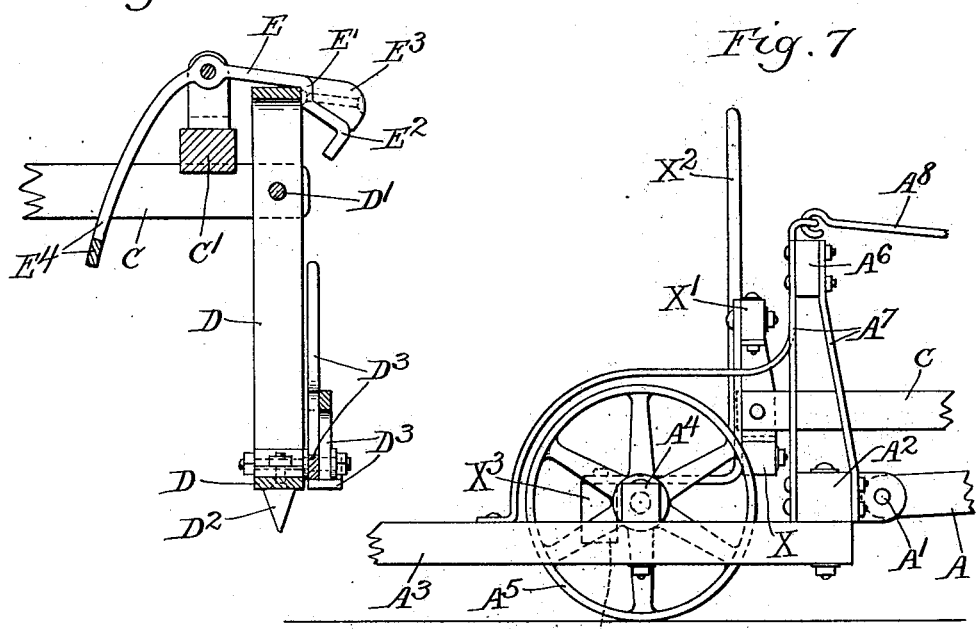
Witness.
Edward F. Wray.
Inventor.
Louis J. Jenson.
by Parker & Carter
Attorneys.

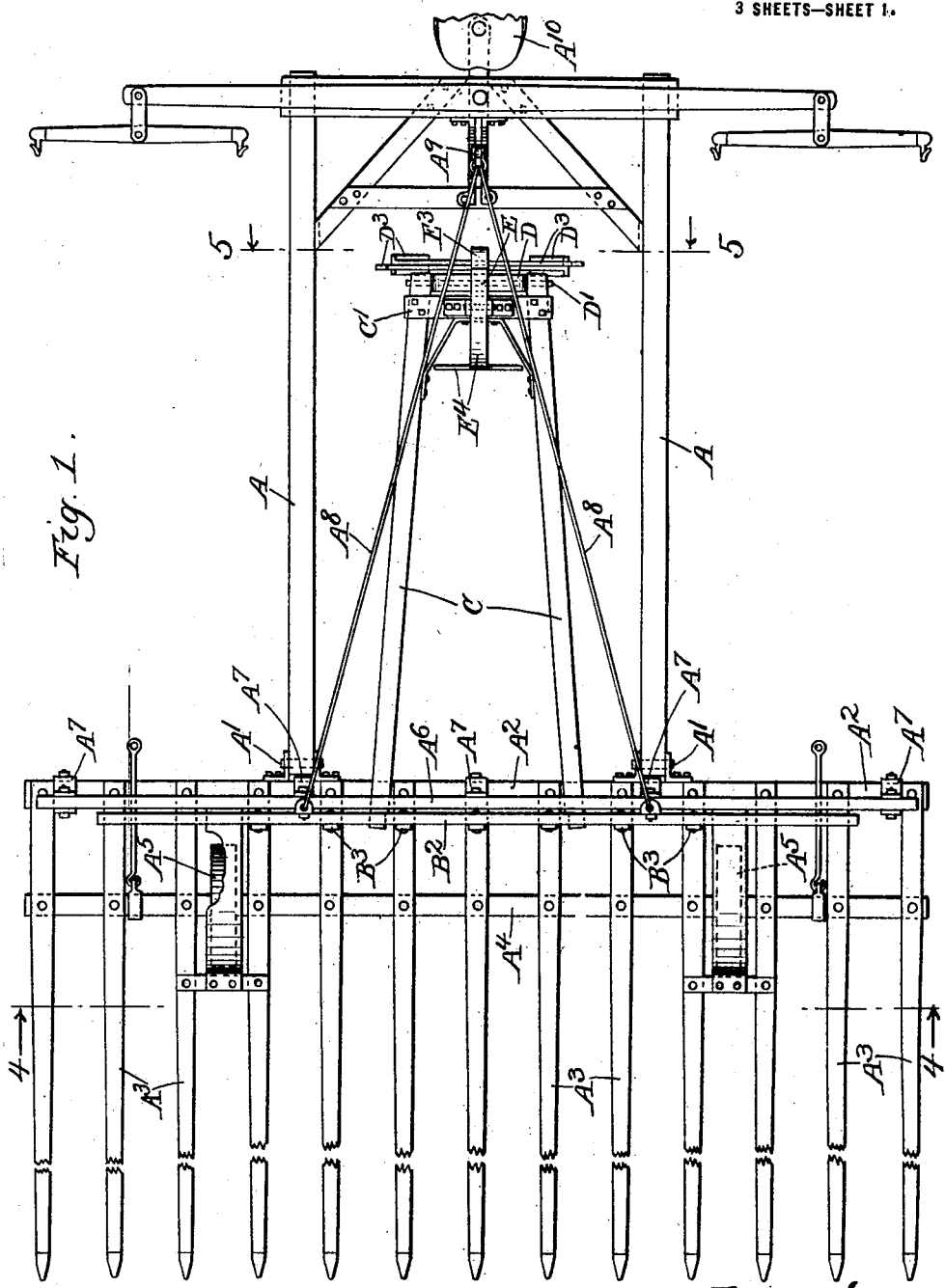

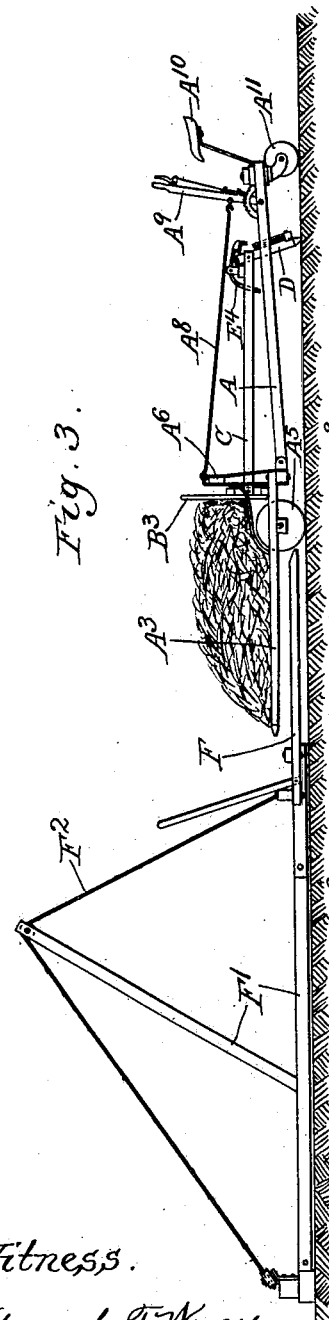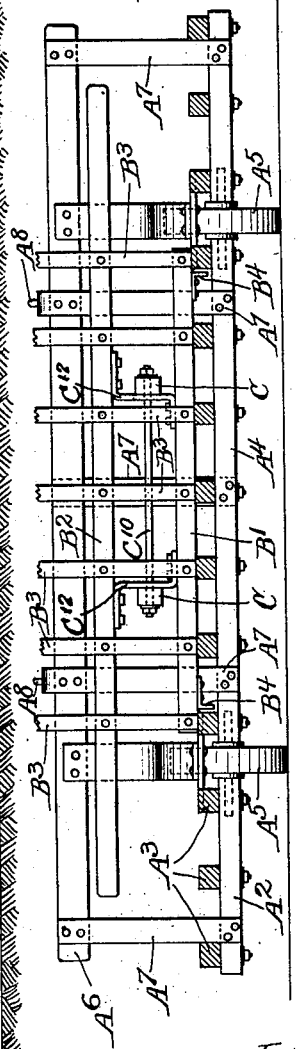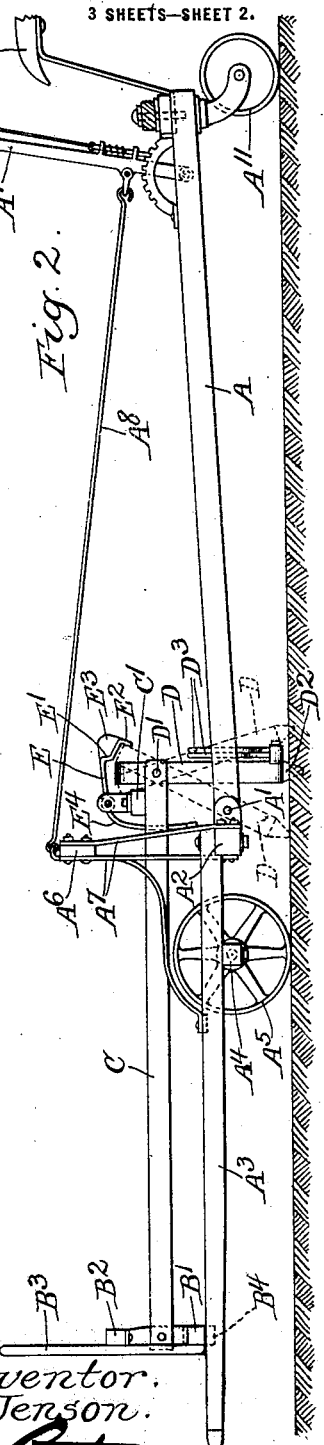

UNITED STATES PATENT OFFICE.

LOUIS J. JENSON, OF FORT COLLINS, COLORADO.

AUTOMATIC HAY-SWEEP CLEANER.

1,371,423.

Specification of Letters Patent. Patented Mar. 15, 1921.

Application filed July 31, 1918. Serial No. 247,687.

*To all whom it may concern:*

Be it known that I, LOUIS J. JENSON, a citizen of the United States, residing at Fort Collins, in the county of Larimer and State of Colorado, have invented a certain new and useful Improvement in Automatic Hay-Sweep Cleaners, of which the following is a specification.

My invention relates to hay sweep cleaners, and more particularly to a hay sweep cleaner which normally remains at the rear of the hay sweep fork during forward motion of the fork, but when the fork is moved rearwardly, is held against rearward motion with the fork, and thus clears the hay from the tines of the fork. Another object is the provision of a ground contacting shoe which in part supports the sweep cleaner, and means for controlling the shoe to resist rearward motion when the sweep is moved to the rear. Another object is the provision of a trip for this shoe which will remove its resistance to rearward motion, after a predetermined motion of the sweep. Other objects will appear from time to time in the specification.

My invention is illustrated in the accompanying drawings wherein,

Figure 1 is a plan view of the hay sweep with the sweep cleaner in place at the rear thereof;

Fig. 2 is a side elevation of the hay sweep with the sweep cleaner pushed forward;

Fig. 3 is a side elevation of the sweep and sweep cleaner together with the hay stacker with which they normally coöperate;

Fig. 4 is a section on the line 4—4 of Fig. 1;

Fig. 5 is a section on the line 5—5 of Fig. 1;

Fig. 6 is a section on the line 6—6 of Fig. 5;

Fig. 7 is a side elevation with parts in section of a modification of my invention;

Like parts are indicated by like letters throughout the several figures.

A, A are shafts forming the body or frame of a hay sweep. Pivoted to them at $A^1$, $A^1$ is the member $A^2$ to which the tines $A^3$, $A^3$ of the fork are secured. The tines are further secured to a transverse member $A^4$, parallel with $A^2$, which supports them, and is in turn supported by the wheels $A^5$, $A^5$, for which it forms the axle. At the rear of the hay sweep fork is a rack formed by the member $A^6$, parallel to and normally above $A^2$, and joined to it by vertical supports $A^7$. To the top of $A^6$, preferably at a point where it is braced by the vertical support, are secured tension members $A^8$, which lead to a controlling lever $A^9$, located on the hay sweep frame. Adjacent it is a seat $A^{10}$ for the operator, and beneath it the supporting wheel $A^{11}$. The structure of the hay sweep can in all parts be greatly varied, without interfering with the application of my hay sweep cleaner, and it will be understood that the structure of the hay sweep does not form part of this invention. Mounted to ride on, and axially movable along the tines, is a rack consisting of parallel members $B^1$ and $B^2$, which are secured together by the reinforcing members $C^{12}$ $C^{12}$. The former is adapted to engage the tines of the fork, and transversely disposed thereto. Joining them are vertical members $B^3$, which serve to hold them in constant relation, and also act as a hay engaging lattice, when the cleaner is pushed along the fork. Their upper ends may, if desired, project well above these two. On the lower side of $B^1$ are brackets or flanges $B^4$, preferably two in number, though more might be used. When two are used, they are positioned to contact the inner sides of two of the tines, the relation between the two tines and the brackets being similar to that of wheel flange and track in normal railroad practice. Lateral motion of the cleaner is thus limited. This form of cleaner is adapted for operation with a sweep where the beam or axle supporting and connecting the tines is disposed flush with them or below them, and the cleaner can freely slide to the rear of the sweep fork. In many cases it is preferable to support the tines beneath the beam, as illustrated in Fig. 7. In the modified form, to suit this condition, X and $X^1$ are parallel transverse members joined by the vertical members $X^2$. Spaced forward from X, and slightly beneath it is the riding member $X^3$, parallel therewith, and fitted with brackets or flanges $X^4$ similar to $B^4$. The horizontal distance between X and $X^3$ is made equal to that between the supporting axle and the rear of the sweep fork, and the cleaner can thus be pushed back to the end of the fork without being impeded by the supporting axle. Attached in any suitable way to the sweep cleaner is a plurality of shafts C joined at their outer ends by the transverse member $C^1$ and at their inner ends adjacent the sweep cleaner by the transversal shaft or binder $C^{10}$. Obviously a single beam could be used, but a double shaft construction gives greater stability with less weight. The members C are positioned to lie well within the shafts A, and do not normally contact them. Their spacing, and that of the vertical support $A^7$ at the rear of the hay sweep fork, permits their free passage therethrough, with the movement of the cleaner along the tines of the fork. Pivoted to the outer end of the sweep cleaner shaft C, is a ground contacting member which might take a variety of forms and material, within the scope of my invention, but which I prefer to construct as a rectangular metallic frame D. It is pivoted adjacent its upper end, to the cleaner shafts, by any suitable means, but I prefer a bar or pin $D^1$, passing through both shafts and the frame. This framework is so shaped as regards its pivot and adjacent members as to allow it normally to take a forwardly inclined position. It is normally held in its forwardly inclined position by holding means which will later be described. The ground contacting side of the frames, which I call a shoe, is furnished with teeth or spurs $D^2$ of any suitable number. Pivoted on the bottom of the frame are bell crank levers $D^3$, their upper ends terminating in vertical segments adapted to engage the shafts A, when the sweep is suddenly turned. At their lower ends they carry curved, ground contacting shoes, which contact the ground only when the upper end of the lever is moved or lifted by contact with the shaft A. Pivoted on the outer ends of the shafts C, or on the connecting member which joins them, is the weighted latch or catch E, the bends $E^1$ and $E^2$ of which form two adjacent catches. At the outer end is the weight $E^3$. Depending from the opposite side of the latch pivot is the downwardly curved lever or trigger $E^4$, adapted to contact the rear of the hay sweep fork, when the cleaner has reached the end of its forward course along the tines of the fork.

F is a hay stacker, adapted to be hoisted on a framework $F^1$, by means of a cable $F^2$. It will be understood that many variations in size, shape and disposition of parts may be made, without departing from the spirit of my invention, and the drawings will be taken as in a sense diagrammatic.

The use and operation of my invention are as follows:—

My hay sweep cleaner is used with any of the hay sweeps now in use, and only minor variations of detail in construction are required to adapt it to the various types. It will be understood that my invention is limited to the hay sweep cleaner itself, and its coöperation with the sweep. It is illustrated and described as applied to a hay sweep whose shafts are pivoted to the hay fork, and means are provided for raising and lowering the fork. The hay sweep is normally propelled by horses, harnessed on either side of the hay sweep shafts.

The rack of the hay sweep cleaner rides on the tines of the fork, and its rearwardly projecting frame lies between the shafts of the sweep. When the sweep is being pushed forward to gather hay, the cleaner rests against the rack at the rear of the sweep fork. The ground contacting shoe and its supporting lever, which is pivoted at the rear of the hay sweep cleaner, inclines forwardly, and offers only sufficient resistance to forward motion to keep the cleaner in place at the rear of the fork. When the sweep has gathered a full load of hay, it is pushed forward to the stack where the hay is to be deposited. In the usual use of hay sweeps, it is necessary at this point to clean the hay sweep by manual forking, for the hay tends to cling to it, even when the sweep fork is tilted or inclined downwardly. This is particularly the case with heavy crops. The sweep is also repeatedly drawn backward and forward, to loosen the hay. In my invention, this difficulty and extra labor is entirely avoided. The sweep is pushed forward till its tines and the load on them are directly over the tines of the hay stacker. It is then drawn backward. The shoe or ground contacting lever is inclined forward, in the direction of the original course of the sweep, as illustrated in Fig. 3 and the weighted catch or latch prevents an inclination in the opposite direction. The lever is thus inclined against rearward motion, and the spiked shoe with its prongs bite into the ground. The result is that while the sweep is drawn backward the cleaner remains fixed firmly in place, and holds the hay in position above the stacker fork, upon which it drops as the sweep fork is drawn from beneath it. When at the end of the backward movement of the sweep, the rear member of the fork contacts the forwardly projecting trigger of the weighted latch, it lifts the latch, and releases the ground contacting lever, which then rotates to a position permitting of movement of the cleaner with the sweep. The second catch or notch of the latch holds the shoe and lever against extreme rotation in the opposite direction. When the course of the sweep is again reversed, the prongs on the ground contacting shoe penetrate the ground, and rotate the lever to its original position where it is again secured by the weighted latch. To provide against any tendency for the spurs of the ground contacting lever to prevent rapid turning of the sweep, levers are provided to tilt the shoe up. They carry sliding shoes at their lower ends, and when the sweep is turned, the levers are contacted by the shafts, and their riding ends lift the spurs out of the ground, and furnish the surface on which the whole shoe and lever can be laterally rotated.

I claim:

1. In a hay sweep cleaner a rack adapted to ride on the tines of a hay sweep, a rearward extension therefrom, a ground contacting shoe pivoted thereon, and means for maintaining it in a position preventing its motion in relation to the normal forward motion of the hay sweep, during withdrawal of the hay sweep.

2. In a hay sweep, a cleaner adapted to ride thereon, a frame rearwardly extending from the cleaner, a ground contacting shoe pivoted on the end thereof, adapted to incline forwardly during forward movement of the hay sweep and cleaner, and means comprising a trigger for holding the member in substantially the same position during rearward motion of the sweep.

3. In a hay sweep, a cleaner adapted to ride thereon, a frame rearwardly extending from the cleaner, a ground contacting shoe pivoted on the end thereof, adapted to incline forwardly during forward movement of the hay sweep and cleaner, and means comprising a weighted trigger for holding the member in substantially the same position during rearward motion of the sweep.

4. In a hay sweep, a cleaner adapted to ride thereon, a frame rearwardly extending from the cleaner, a ground contacting shoe pivoted on the end thereof, adapted to incline forwardly during forward movement of the hay sweep and cleaner, and means comprising a latch for holding the member in substantially the same position during rearward motion of the sweep, and means for releasing the latch after a predetermined rearward movement of the sweep, comprising a trigger attached thereto.

5. In a hay sweep, a cleaner adapted to ride thereon, a frame rearwardly extending from the cleaner, a ground contacting shoe on the end thereof, and a pivoted member supporting said shoe, said member adapted to incline forwardly during forward movement of the hay sweep and cleaner, means comprising a latch for holding the member in substantially the same position during rearward motion of the sweep, and means responsive to contact of the sweep with the latch for releasing said catch after a predetermined rearward movement of the sweep.

6. In a hay sweep, a cleaner adapted slidably to ride thereon, a frame rearwardly extending from the cleaner, a ground contacting shoe thereon, sharp ground gripping studs depending from said shoe, and means responsive to lateral movement of the hay sweep for disengaging said studs from the ground.

7. In a hay sweep having rearwardly extending shafts, a cleaner adapted to ride thereon, a frame rearwardly extending from the cleaner between the shafts, a ground contacting shoe mounted thereon, sharp ground gripping studs mounted on said shoe, and means responsive to the contact of the hay sweep shafts with the cleaner frame for disengaging said studs from the ground during lateral motion of the hay sweep shafts.

8. In a hay sweep having rearwardly extending shafts, a cleaner adapted to ride thereon, a frame rearwardly extending from the cleaner between the shafts, a ground contacting shoe mounted thereon, sharp ground gripping studs mounted on said shoe, and means responsive to the contact of the hay sweep shafts with the cleaner frame for disengaging said studs from the ground during lateral motion of the hay sweep shafts comprising lifting levers mounted on the shoe.

9. In a hay sweep having rearwardly extending shafts, a cleaner adapted to ride thereon, a frame rearwardly extending from the cleaner between the shafts, a ground contacting shoe mounted thereon, sharp ground gripping studs mounted on said shoe, and means responsive to the contact of the hay sweep shafts with the cleaner frame for disengaging said studs from the ground during lateral motion of the hay sweep shafts comprising rocking levers mounted on the shoe, one end of said levers adapted to contact the hay sweep shaft, and the other adapted to raise the shoe from the ground.

10. In a hay sweep, a cleaner adapted to ride thereon, a frame rearwardly extending from the cleaner, a ground contacting shoe mounted thereon, and means responsive to lateral movement of the hay sweep for disengaging said shoe from the ground.

11. In a hay sweep, a cleaner adapted slidably to ride thereon, a frame rearwardly extending from the cleaner, a laterally disposed ground contacting shoe on the end thereof, and a pivoted member supporting said shoe, said member adapted to incline forwardly during forward movement of the hay sweep and cleaner, means comprising a latch for holding the member in a substantially vertical position during rearward motion of the sweep, and means responsive to contact of the sweep with the latch for releasing said catch after a predetermined rearward movement of the sweep said latch being provided with an additional catch adapted to limit the rotation of the pivoted member, after the release of the latch.

12. A hay sweep cleaner adapted to be mounted on a hay sweep, comprising a hay contacting rack, a rearward extension therefrom, a ground gripping member on said extension adapted to hold the rack stationary during rearward movement of the sweep, and adapted to be disengaged by contact with the rearwardly moving hay sweep.

13. A hay sweep cleaner adapted to be mounted on a hay sweep, comprising a hay contacting rack, a rearward extension therefrom, a ground gripping member on said extension adapted to hold the rack stationary during rearward movement of the sweep, a latch adapted normally to secure said gripping member in place, and adapted to release it when contacted by the rearwardly moving hay sweep.

14. A hay sweep cleaner adapted to be mounted on a hay sweep, comprising a hay contacting rack, a rearward extension therefrom, a ground gripping member on said extension adapted to hold the rack stationary during rearward movement of the sweep, a latch adapted normally to secure said gripping member in place, a trigger controlling said latch, and adapted to lift it and release the gripping member, when contacted by the rearwardly moving hay sweep.

15. A hay sweep cleaner adapted to be mounted on a hay sweep, comprising a hay contacting rack, a rearward extension therefrom, a ground gripping member on said extension adapted to hold the rack stationary during rearward movement of the sweep, a weighted latch adapted normally to secure said gripping member in place, a trigger controlling said latch, and adapted to lift it and release the gripping member, when contacted by the rearwardly moving hay sweep.

In testimony whereof I affix my signature in the presence of two witnesses this tenth day of July, 1918.

LOUIS J. JENSON.

Witnesses:
L. B. CROSBY,
S. H. CAMMER.